(12) United States Patent
Yamaguchi (10) Patent No.: US 11,184,549 B2
(45) Date of Patent: Nov. 23, 2021

(54) IMAGE-CAPTURING SYSTEM, INFORMATION PROCESSING APPARATUS, CONTROL METHOD OF INFORMATION PROCESSING APPARATUS, AND STORAGE MEDIUM

(71) Applicant: CANON KABUSHIKI KAISHA, Tokyo (JP)

(72) Inventor: Takashi Yamaguchi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/370,081

(22) Filed: Mar. 29, 2019

(65) Prior Publication Data

US 2019/0313030 A1    Oct. 10, 2019

(30) Foreign Application Priority Data

Apr. 4, 2018   (JP) .............................. JP2018-072231

(51) Int. Cl.
   *H04N 5/232*     (2006.01)
   *H04N 5/247*     (2006.01)

(52) U.S. Cl.
   CPC ..... *H04N 5/23299* (2018.08); *H04N 5/23238* (2013.01); *H04N 5/247* (2013.01); *H04N 5/23206* (2013.01); *H04N 5/23216* (2013.01)

(58) Field of Classification Search
   CPC ........................... H04N 7/181; H04N 5/23296
   See application file for complete search history.

(56) References Cited

U.S. PATENT DOCUMENTS

| 2013/0336526 A1* | 12/2013 | Cetin | G06K 9/00147 |
| | | | 382/103 |
| 2017/0280103 A1* | 9/2017 | Burke | H04N 5/23206 |
| 2019/0199926 A1* | 6/2019 | An | H04N 5/225 |

FOREIGN PATENT DOCUMENTS

| CN | 102577347 A | 7/2012 |
| CN | 106341522 A | 1/2017 |
| CN | 107025694 A | 8/2017 |
| CN | 107690649 A | 2/2018 |
| JP | 2006-128932 A | 5/2006 |
| JP | 2015-141471 A | 8/2015 |
| WO | 2018043884 A1 | 3/2018 |

* cited by examiner

*Primary Examiner* — Samira Monshi
(74) *Attorney, Agent, or Firm* — Canon U.S.A., Inc. IP Division (57) ABSTRACT

An image-capturing system according to various embodiments of the present disclosure includes a first image-capturing unit configured to acquire a first image, a second image-capturing unit configured to change at least any one of an image-capturing direction or a viewing angle, a first display control unit configured to execute control of displaying a specification screen on which the first image is displayed, an image-capturing control unit configured to control the second image-capturing unit to acquire a second image by imaging an image-capturing area corresponding to a first screen area by controlling at least an image-capturing direction or a viewing angle of the second image-capturing unit based on the first screen area specified at the specification screen, and a second display control unit configured to execute control of displaying the second image.

12 Claims, 8 Drawing Sheets

IMAGE-CAPTURING SYSTEM, INFORMATION PROCESSING APPARATUS, CONTROL METHOD OF INFORMATION PROCESSING APPARATUS, AND STORAGE MEDIUM

BACKGROUND

Field

The present disclosure relates to an image-capturing system, an information processing apparatus, a control method of the information processing apparatus, and a storage medium.

Description of the Related Art

A wide-area monitoring application and a precise monitoring application have been known to be used in a monitoring camera installed, for example, in a city. The wide-area monitoring application is an application intended for monitoring a specific site where an event such as an accident has occurred or for tracking a path of a moving object. The precise monitoring application is an application intended for precisely imaging an event or a specific object.

However, in order to satisfy the requirements of the above-described two monitoring applications in a single monitoring camera, it is necessary to provide a monitoring camera capable of imaging a wide area while also maintaining the resolution necessary for precisely capturing an image. Therefore, there has been a limitation in performance of an image sensor or an optical lens usable for a monitoring camera capable of realizing the functions of the above-described two monitoring applications.

With respect to the above point, a monitoring system is known which uses a fixed viewing angle camera (hereinafter, referred to as "wide-area camera") intended for monitoring a wide area by using a plurality of cameras, as well as a pan-tilt-zoom (PTZ) camera intended for precisely imaging a part of a range in a periphery of the monitored wide area (Japanese Patent Application Laid-Open No. 2006-128932). The PTZ camera can change an image-capturing direction by changing an orientation of a lens barrel that includes an optical lens and an image sensor, in a pan direction or a tilt direction, so that an image-capturing area can be adjusted according to an instruction from a user. Further, the PTZ camera can execute a zooming operation by moving a position of the optical lens in an optical axis direction of the image sensor, so that a viewing angle can be changed according to a user operation.

Two operation methods have been mainly known as the user operation methods for the above-described PTZ camera. A first operation method is a method of independently operating the PTZ camera. Specifically, the PTZ camera is operated with a button or a joystick provided on a controller dedicated for the PTZ camera or operated through a graphical user interface (GUI) displayed on a screen (Japanese Patent Application Laid-Open No. 2015-141471). In the second operation method, as described in Japanese Patent Application Laid-Open No. 2006-128932, a user selects a range where the user would like to precisely capture an image from an image captured by the wide-area camera. Control amounts of pan/tilt/zoom operations are calculated, and predetermined motors included in the image-capturing apparatus are driven based on the calculation result, so that the range selected by the user is captured by the PTZ camera. In the second operation method, the operation can be intuitively executed because an image-capturing area of the PTZ camera can be set from the image captured by the wide-area camera. Therefore, the image-capturing area of the PTZ camera can be instantaneously adjusted to a target image-capturing area.

However, with the second operation method, even if the PTZ camera described as one example of a second image-capturing unit can capture the area outside the image-capturing area of the wide-area camera described as one example of a first image-capturing unit, the image-capturing area of the second image-capturing unit is limited to an area within the image-capturing area of the first image-capturing unit. Therefore, the above-described second operation method cannot be used in a case where an entirety of the object that is positioned across a boundary of the image-capturing area of the first image-capturing unit is to be imaged by the second image-capturing unit and displayed. On the other hand, with the first operation method, it is difficult to intuitively adjust the image-capturing area of the PTZ camera to a target image-capturing area.

SUMMARY

According to various embodiments of the present disclosure, an image-capturing system includes a first image-capturing unit configured to acquire a first image by imaging a determined image-capturing area, a second image-capturing unit configured to change at least any one of an image-capturing direction or a viewing angle, a first display control unit configured to execute control of displaying a specification screen on which the first image is displayed, wherein a first screen area including an area different from an area where the first image is displayed can be specified through the specification screen, an image-capturing control unit configured to control the second image-capturing unit to acquire a second image by imaging an image-capturing area corresponding to the first screen area by controlling at least any one of an image-capturing direction or a viewing angle of the second image-capturing unit based on the first screen area specified at the specification screen, and a second display control unit configured to execute control of displaying the second image acquired through the control executed by the image-capturing control unit.

Further features will become apparent from the following description of exemplary embodiments with reference to the attached drawings.

DESCRIPTION OF THE EMBODIMENTS

Figure 1A:
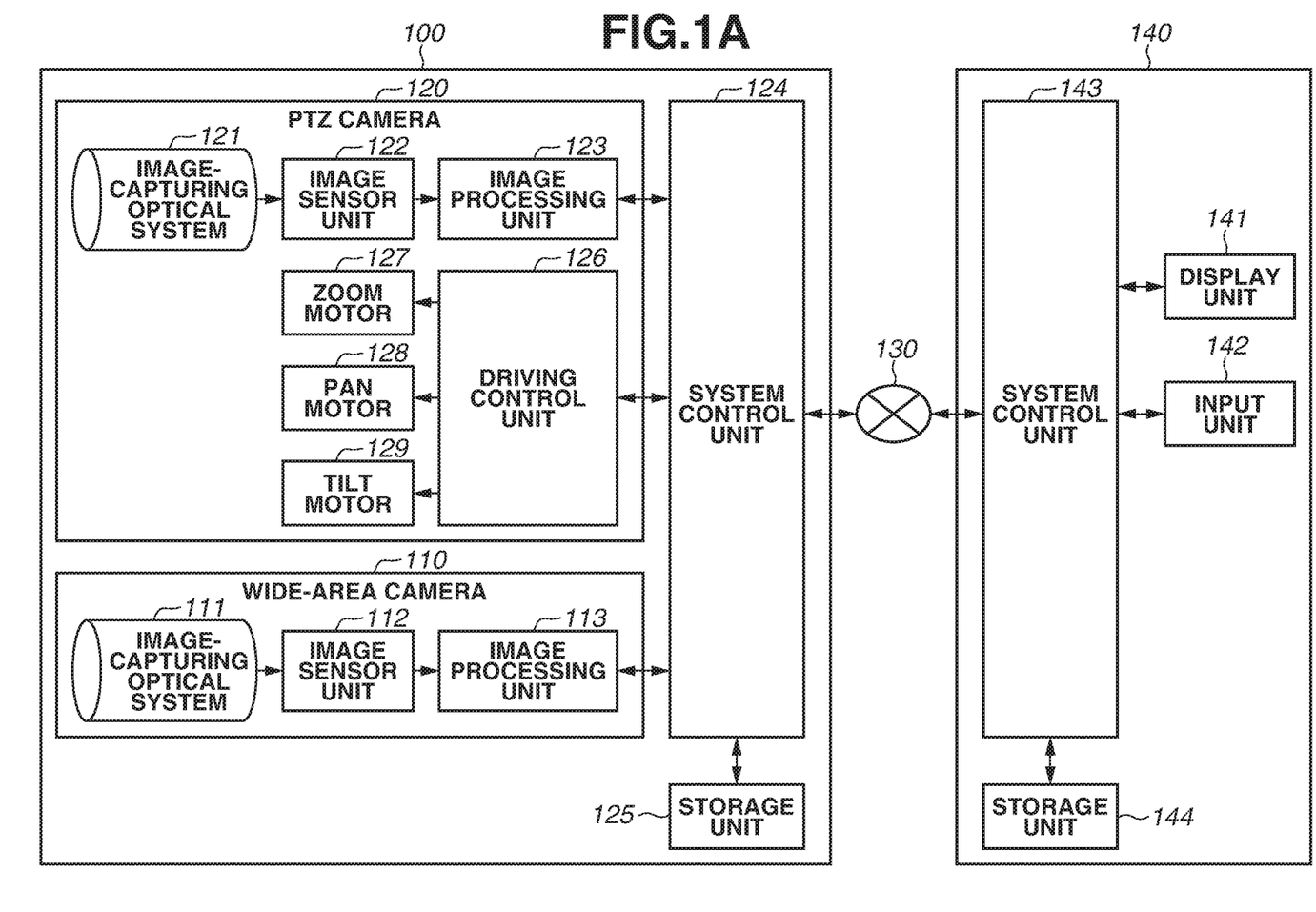
FIGS. 1A, 1B, and 1C are block diagrams illustrating an example of a configuration of an image-capturing system according to one embodiment.

An image-capturing system will be described with reference to FIG. 1A. FIG. 1A is a block diagram illustrating an example of a configuration of the image-capturing system. The image-capturing system includes an image-capturing apparatus 100 and a client apparatus 140. The image-capturing apparatus 100 and the client apparatus 140 are connected to each other via an internet protocol (IP) network 130 in a mutually communicable state.

The image-capturing apparatus 100 includes a wide-area camera 110, a pan-tilt-zoom (PTZ) camera 120, a system control unit 124, and a storage unit 125.

The wide-area camera 110 is configured of an image-capturing optical system 111, an image sensor unit 112, and an image processing unit 113.

The image sensor unit 112 outputs an electric signal of an image based on light passing through the image-capturing optical system 111. The image sensor unit 112 is configured of a charge coupled device (CCD) sensor or a complementary metal-oxide semiconductor (CMOS) sensor. The wide-area camera 110 is one example of a first image-capturing unit.

The image processing unit 113 executes determined image processing based on an electric signal of an image output from the image sensor unit 112.

In the example illustrated in FIG. 1A, just one image-capturing optical system 111 and one image sensor unit 112 are illustrated in the wide-area camera 110. However, the numbers thereof are not limited thereto, so that the wide-area camera 110 may be configured of a plurality of image-capturing optical systems 111 and image sensor units 112. For example, the wide-area camera 110 may include a plurality of cameras. Herein, each of the cameras includes one image-capturing optical system 111 and one image sensor unit 112. In a case where the wide-area camera 110 includes a plurality of cameras, the wide-area camera 110 may capture a wide area by combining the images output from the respective cameras and generating a panoramic image through the image processing unit 113. Each of the cameras which constitutes the wide-area camera 110 may include the image processing unit 113. In this case, the system control unit 124 may combine the output images of the respective cameras to generate a panoramic image. The wide-area camera 110 captures an image at a fixed viewing angle.

The PTZ camera 120 can change the image-capturing direction in a pan direction and a tilt direction and further execute zooming by changing a viewing angle. The PTZ camera 120 includes an image-capturing optical system 121, an image sensor unit 122, an image processing unit 123, a driving control unit 126, a zoom motor 127, a pan motor 128, and a tilt motor 129. The PTZ camera 120 is one example of a second image-capturing unit capable of changing at least any one of the image-capturing direction and the viewing angle.

The image-capturing optical system 121 includes a focus lens or an aperture mechanism (not illustrated). The image-capturing optical system 121 is controlled by the system control unit 124 to capture the image under an optimum exposure condition. Furthermore, the image-capturing optical system 121 can adjust a viewing angle by driving through the zoom motor 127 an optical lens arranged to be movable in an optical axis direction of the image sensor unit 122.

The image sensor unit 122 outputs an electric signal of an image based on light passing through the image-capturing optical system 121. The image sensor unit 122 is configured of a CCD sensor or a CMOS sensor.

The image processing unit 123 executes determined image processing based on an electric signal of an image output from the image sensor unit 122.

The driving control unit 126 controls the zoom motor 127, the pan motor 128, and the tilt motor 129 based on the control of the system control unit 124 to change the image-capturing direction or the viewing angle of the PTZ camera 120. The system control unit 124 controls the driving control unit 126 according to a control command received from the client apparatus 140. Through the above-described control, the image-capturing direction or the viewing angle of the PTZ camera 120 is controlled so that an image-capturing area specified by the user through an input unit 142 of the client apparatus 140 is imaged. The zoom motor 127 causes the optical lens of the image-capturing optical system 121 to move in the optical axis direction of the image sensor unit 122 based on the control of the driving control unit 126.

The pan motor 128 causes the image-capturing direction of the PTZ camera 120 to be moved in the pan direction based on the control of the driving control unit 126.

The tilt motor 129 causes the image-capturing direction of the PTZ camera 120 to be moved in the tilt direction based on the control of the driving control unit 126.

The system control unit 124 generally controls the respective constituent elements of the image-capturing apparatus 100, sets various parameters, and controls communication with respect to the client apparatus 140. More specifically, the system control unit 124 executes various kinds of processing such as image-capturing control, compression coding of images, image clipping, generation of output images, and network distribution. The system control unit 124 can realize a digital PTZ function through image clipping.

Figure 1B:
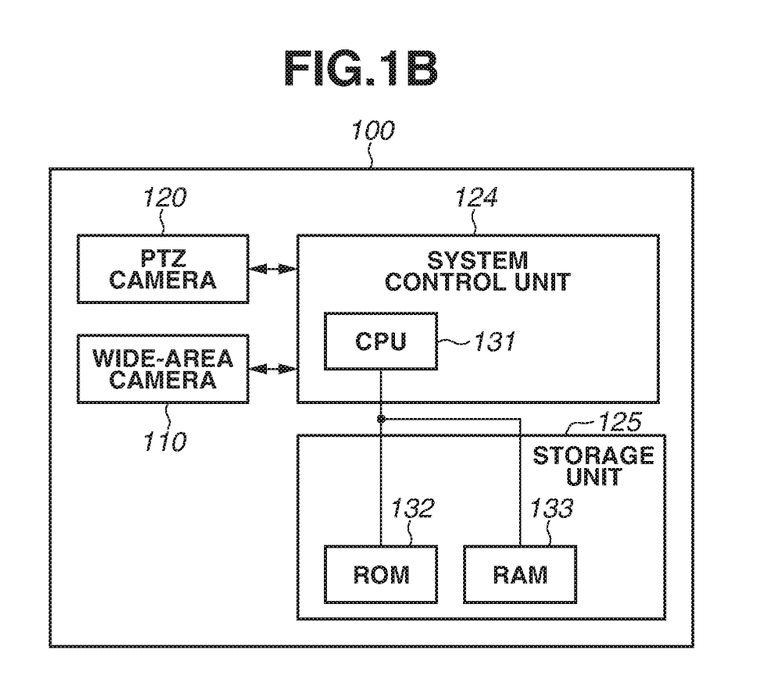

As illustrated in FIG. 1B illustrating an example of the configuration of the image-capturing apparatus 100, the system control unit 124 includes a central processing unit (CPU) 131. Further, as illustrated in FIG. 1B, the storage unit 125 includes a read only memory (ROM) 132 and a random access memory (RAM) 133. The CPU 131 loads a program stored in the ROM 132 to the RAM 133 and executes the program, so that processing in FIG. 7 or other processing executed by the system control unit 124 is realized. The RAM 133 is used as a work area for executing a program and a storage area of various kinds of data and parameter information. The storage unit 125 includes a non-volatile memory, so that various kinds of data or parameter information may be stored in the non-volatile memory.

The client apparatus 140 includes a display unit 141, an input unit 142, a system control unit 143, and a storage unit 144. The client apparatus 140 is one example of an information processing apparatus.

The display unit 141 displays various screens and images. For example, a liquid crystal display is used as the display unit 141.

The input unit 142 is configured of a mouse and a keyboard that can be operated by the user. The display unit 141 may be configured of a touch panel, and function as the input unit 142.

The system control unit 143 generally controls the respective constituent elements of the client apparatus 140, sets various parameters, and controls communication with respect to the image-capturing apparatus 100.

Figure 1C:
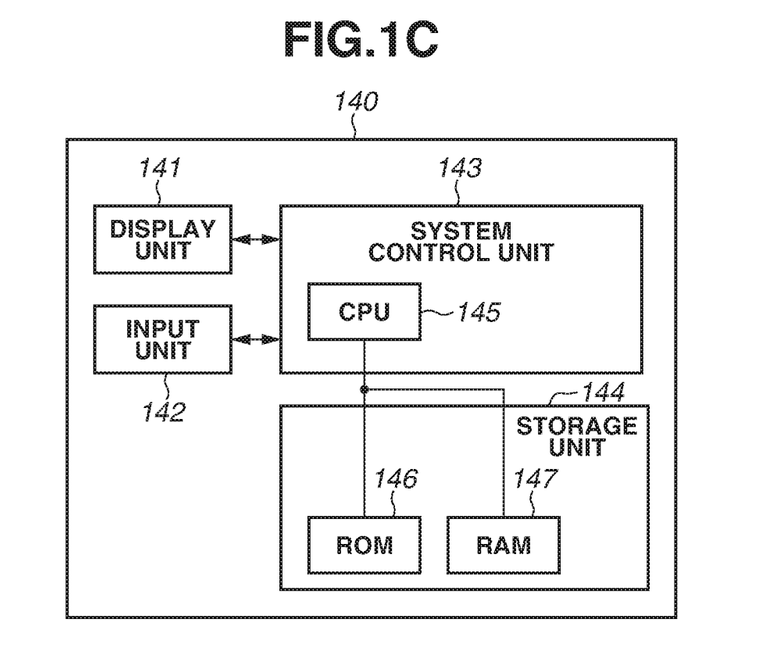

As illustrated in FIG. 1C illustrating an example of the configuration of the client apparatus 140, the system control unit 143 includes a CPU 145. As illustrated in FIG. 1C, the storage unit 144 includes a ROM 146 and a RAM 147. The CPU 145 loads a program stored in the ROM 146 to the RAM 147 and executes the program, so that processing to be executed by the system control unit 143 is realized. The RAM 147 is used as a work area for executing a program and a storage area of various kinds of data and parameter information. The storage unit 144 includes a non-volatile memory, so that a program and various kinds of data may be stored in the non-volatile memory.

An information processing terminal such as a personal computer (PC) or a mobile phone regarded as an external apparatus of the image-capturing apparatus 100 is used as the client apparatus 140, although the client apparatus 140 is not limited thereto.

For example, the IP network 130 is configured of a plurality of routers, switches, and cables which satisfy a communication standard such as the Ethernet (registered trademark). However, in the present exemplary embodiment, as long as communication between the image-capturing apparatus 100 and the client apparatus 140 is executable, a communication standard, a scale, and a configuration of the IP network 130 are not taken into consideration. For example, the IP network 130 may be configured of a wired local area network (LAN), a wireless LAN, or a wide area network (WAN).

The system control unit 143 of the client apparatus 140 transmits various control commands to the image-capturing apparatus 100 via the P network 130. The control commands represent instructions with respect to the image-capturing apparatus 100. The control commands include a setting instruction of image-capturing parameters with respect to the wide-area camera 110 or the PTZ camera 120, a driving control instruction with respect to the driving components of the image-capturing apparatus 100, and a video streaming starting/stopping instruction. The driving components of the image-capturing apparatus 100 include the zoom motor 127, the pan motor 128, and the tilt motor 129.

The system control unit 124 of the image-capturing apparatus 100 receives a control command from the client apparatus 140 and transmits a response to the received control command to the client apparatus 140, via the IP network 130.

The system control unit 124 of the image-capturing apparatus 100 distributes the images captured by the wide-area camera 110 or the PTZ camera 120 to the client apparatus 140 via the IP network 130. The system control unit 143 of the client apparatus 140 controls the display unit 141 to display the images received from the image-capturing apparatus 100. With the processing, the user can browse the images distributed from the image-capturing apparatus 100. Further, by operating the input unit 142, the user can input an instruction for changing the image-capturing direction or the viewing angle of the PTZ camera 120.

Figure 2A:
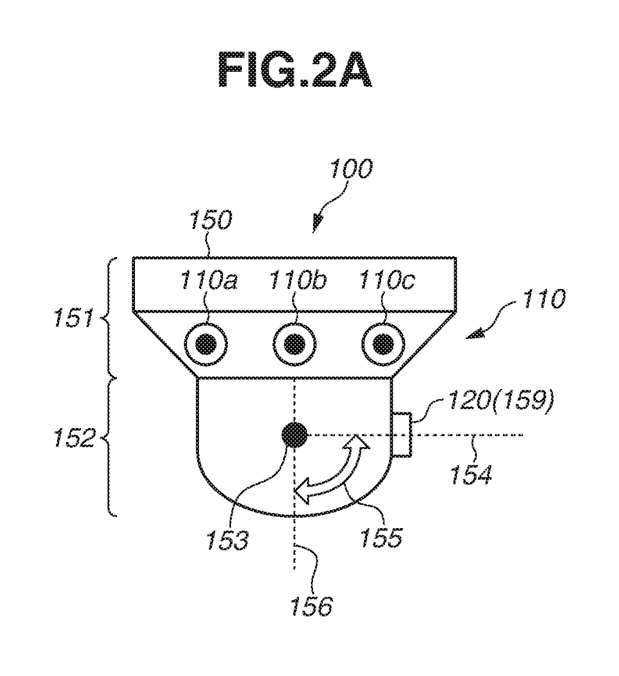
FIGS. 2A and 2B are diagrams illustrating an example of an external view of an image-capturing apparatus according to one embodiment.
Figure 2B:
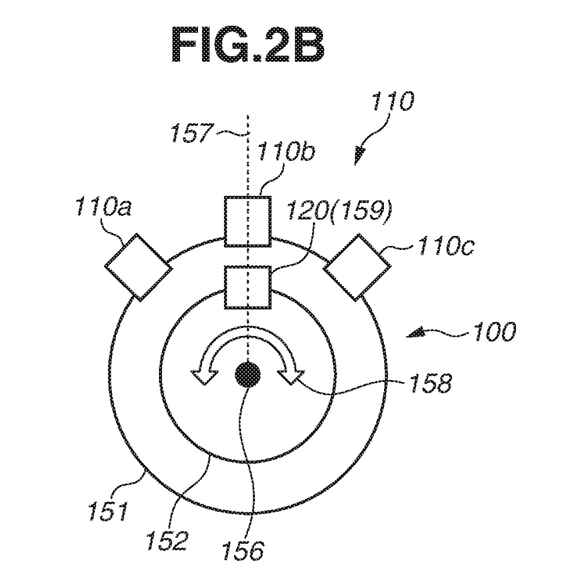

Next, the image-capturing apparatus 100 will be further described with reference to FIGS. 2A and 2B. FIG. 2A is a diagram illustrating an example of a side face of the image-capturing apparatus 100. FIG. 2B is a top plan view of the image-capturing apparatus 100 viewed from a side of a rotation portion 152 described below.

The image-capturing apparatus 100 includes a fixed portion 151 and the rotation portion 152.

The fixed portion 151 is fixed to an installation site of the image-capturing apparatus 100 such as the ceiling. More specifically, the fixed portion 151 has an installation face 150, and the installation face 150 is fixed to the ceiling or a dedicated attachment member, so that the image-capturing apparatus 100 is installed on the ceiling. The wide-area camera 110 is arranged on the fixed portion 151. The wide-area camera 110 captures the image at a fixed viewing angle based on the installation state of the image-capturing apparatus 100. In the example illustrated in FIG. 2A, the wide-area camera 110 includes a first camera 110a, a second camera 110b, and a third camera 110c. However, the number of cameras constituting the wide-area camera 110 is not limited to three, and for example, the wide-area camera 110 may be configured of four or more cameras, so that an image of the entire circumference of the image-capturing apparatus 100 can thereby be captured. Alternatively, the wide-area camera 110 may be configured of a single camera, and a wide-angle lens is used for the image-capturing optical system 111 of the camera, so that a wide area can thereby be imaged.

The rotation portion 152 is arranged on a side opposite to the installation face 150 of the fixed portion 151. The rotation portion 152 can be rotated within a range specified by making a first rotation axis 156 as a center. For example, the first rotation axis 156 is perpendicular to the installation face 150.

The PTZ camera 120 is arranged on the rotation portion 152. When the rotation portion 152 rotates about the first rotation axis 156, the PTZ camera 120 rotates together with the rotation portion 152 based on the first rotation axis 156. With this configuration, the PTZ camera 120 rotates in the pan direction indicated by an arrow 158 in FIG. 2B, so that the image-capturing direction of the PTZ camera 120 is changed. Herein, an image-capturing direction of the PTZ camera 120 regarded as a reference in the pan direction is specified as a first reference direction 157 in FIG. 2B. In the present exemplary embodiment, the pan angle of the PTZ camera 120 can be changed within a range between −90° to +90°. The pan angle of the PTZ camera 120 is an image-capturing angle in the pan direction when the first reference direction 157 is specified as a reference. The PTZ camera 120 rotates based on the change of the pan angle to change the image-capturing direction thereof. A changeable range of the pan angle of the PTZ camera 120 is not limited to the range between −90° to +90° but may be a range between −5° to 90°, and an optional range can be determined based on the structure of the image-capturing apparatus 100. The pan motor 128 makes the PTZ camera 120 rotate in the pan direction.

Further, a lens barrel 159 which includes the image-capturing optical system 121 and the image sensor unit 122 of the PTZ camera 120 is configured to be rotatable about the second rotation axis 153 vertical to the first rotation axis 156. With this configuration, the PTZ camera 120 rotates in the tilt direction indicated by an arrow 155 in FIG. 2A to change the image-capturing direction of the PTZ camera 120. Herein, an image-capturing direction of the PTZ camera 120 regarded as a reference in the tilt direction is specified as a second reference direction 154 in FIG. 2A. In the present exemplary embodiment, the tilt angle of the PTZ camera 120 can be changed within a range between −0° to +60°. The tilt angle of the PTZ camera 120 is an image-capturing angle in the tilt direction when the second reference direction 154 is specified as a reference. The PTZ camera 120 rotates based on the change of the tilt angle to change the image-capturing direction thereof. A changeable range of the tilt angle of the PTZ camera 120 is not limited to the range between −0° to +60° but may be a range between −5° to 90°, and an optional range can be determined based on the structure of the image-capturing apparatus 100. The tilt motor 129 makes the PTZ camera 120 rotate in the tilt direction.

Figure 3:
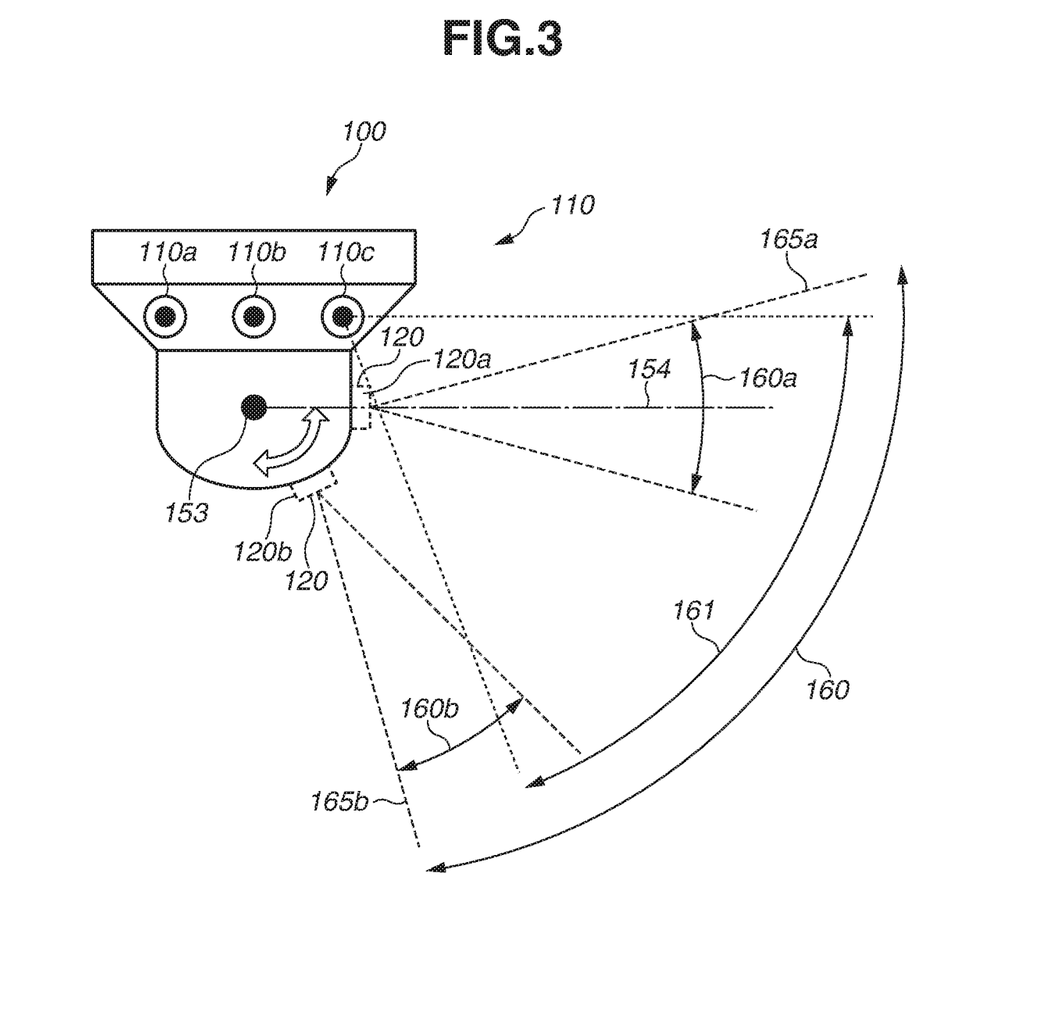
FIG. 3 is a diagram illustrating an example of an image-capturing area of the image-capturing apparatus in a tilt direction according to one embodiment.

Subsequently, an image-capturing area of the image-capturing apparatus 100 in the tilt direction will be described with reference to FIG. 3. FIG. 3 is a diagram illustrating an example of the image-capturing area of the image-capturing apparatus 100 in the tilt direction.

An image-capturable area 160 in FIG. 3 refers to an image-capturing area that can be imaged by the PTZ camera 120, and the PTZ camera 120 can image a part of the image-capturable area 160 by changing the tilt angle. A first image-capturing area 160a in FIG. 3 is the image-capturing area in the tilt direction when the tilt angle of the PTZ camera 120 is 00. Further, a second image-capturing area 160b in FIG. 3 is the image-capturing area in the tilt direction when the tilt angle of the PTZ camera 120 is +60°. The tilt angle of the PTZ camera 120 can be changed within a range between 0° to +60°. Therefore, the image-capturable area 160 can be determined as a range between an image-capturing boundary 165a on the minus side in the tilt direction in the first image-capturing area 160a and an image-capturing boundary 165b on the plus side in the tilt direction in the second image-capturing area 160b. A position 120a in FIG. 3 is a position of the PTZ camera 120 when the tilt angle of the PTZ camera 120 is 00. A position 120b in FIG. 3 is a position of the PTZ camera 120 when the tilt angle of the PTZ camera 120 is +60°.

An image-capturing area 161 is a range in the tilt direction constantly imaged by the wide-area camera 110.

Figure 4:
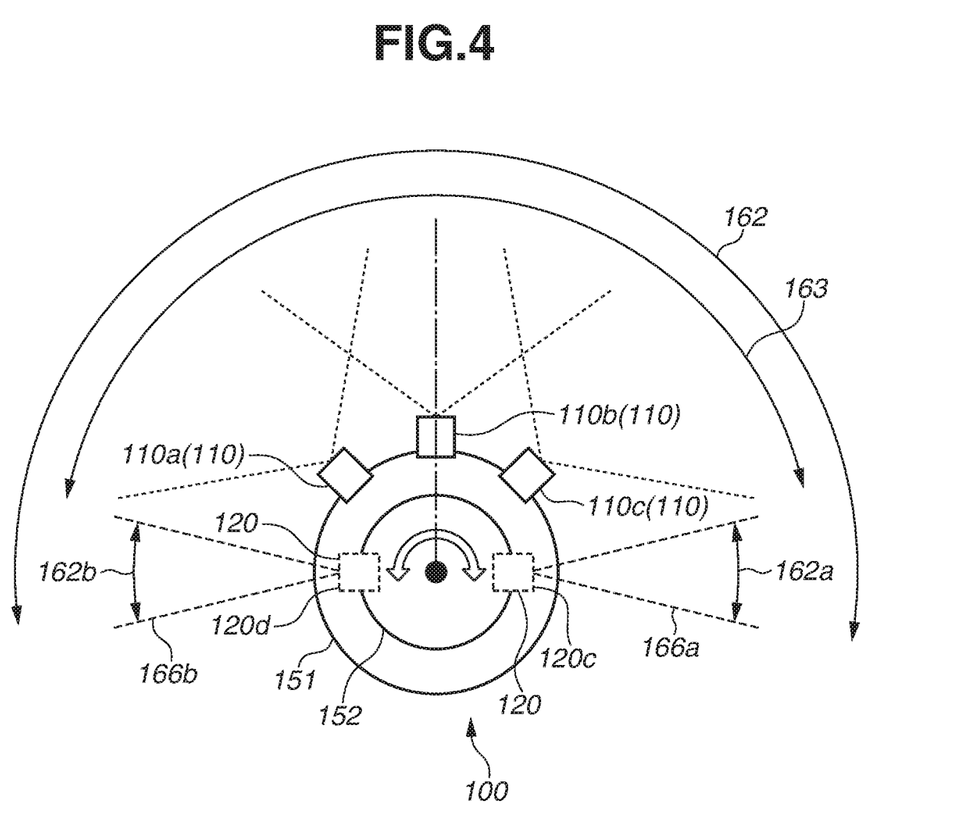
FIG. 4 is a diagram illustrating an example of an image-capturing area of the image-capturing apparatus in a pan direction according to one embodiment.

Next, an image-capturing area of the image-capturing apparatus 100 in the pan direction will be described with reference to FIG. 4. FIG. 4 is a diagram illustrating an example of the image-capturing area of the image-capturing apparatus 100 in the pan direction.

An image-capturable area 162 in FIG. 4 is an image-capturing area that can be imaged by the PTZ camera 120, and the PTZ camera 120 can image a part of the image-capturable area 162 by changing the pan angle. A third image-capturing area 162a in FIG. 4 is the image-capturing area in the pan direction when the pan angle of the PTZ camera 120 is +90°. Further, a fourth image-capturing area 162b in FIG. 4 is the image-capturing area in the pan direction when the pan angle of the PTZ camera 120 is −90°. The pan angle of the PTZ camera 120 can be changed within a range between −90° to +900. Therefore, the image-capturable area 162 can be determined as a range between an image-capturing boundary 166a on the plus side in the pan direction in the third image-capturing area 162a and an image-capturing boundary 166b on the minus side in the pan direction in the fourth image-capturing area 162b. A position 120c in FIG. 4 is a position of the PTZ camera 120 when the pan angle of the PTZ camera 120 is +90°. A position 120d in FIG. 4 is a position of the PTZ camera 120 when the pan angle of the PTZ camera 120 is −90°.

An image-capturing area 163 is a range in the pan direction constantly imaged by the wide-area camera 110.

As illustrated in FIG. 3, the image-capturing area 161 in the tilt direction of the wide-area camera 110 is included in the image-capturable area 160 in the tilt direction of the PTZ camera 120. Further, as illustrated in FIG. 4, the image-capturing area 163 in the pan direction of the wide-area camera 110 is included in the image-capturable area 162 in the pan direction of the PTZ camera 120. Then, the PTZ camera 120 can image a part of the range including the image-capturing areas 161 and 163 of the wide-area camera 110 by changing the pan angle and the tilt angle. In the present exemplary embodiment, the image-capturable areas 160 and 162 of the PTZ camera 120 are set to cover the entire range of the image-capturing areas 161 and 163 of the wide-area camera 110, and the PTZ camera 120 can capture the areas outside the image-capturing areas 161 and 163 of the wide-area camera 110. However, the configuration is not limited thereto, and the configuration may be such that at least a part of the image-capturing areas 161 and 163 of the wide-area camera 110 and the image-capturable areas 160 and 162 of the PTZ camera 120 overlap. For example, the image-capturing areas 161 and 163 of the wide-area camera 110 and the image-capturable areas 160 and 162 of the PTZ camera 120 may partially overlap only in the pan direction or in the tilt direction.

Figure 5:
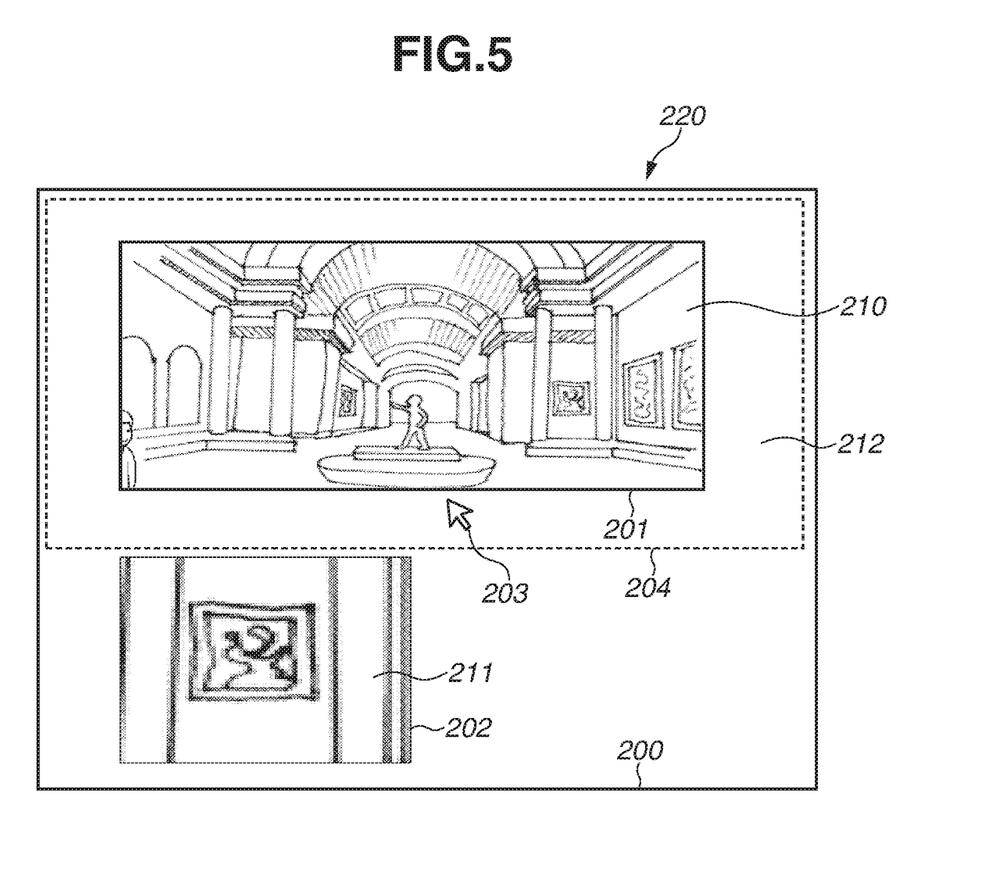
FIG. 5 is a diagram illustrating an example of a specification screen according to one embodiment.

Next, a specification screen 220 will be described with reference to FIG. 5. FIG. 5 is a diagram illustrating an example of the specification screen 220. The system control unit 143 of the client apparatus 140 controls the specification screen 220 to be displayed at the display unit 141. The processing is one example of the processing executed by the first display control unit.

The specification screen 220 is a screen on which a first image 210 acquired by the image-capturing operation of the wide-area camera 110 and a second image 211 acquired by the image-capturing operation of the PTZ camera 120 are displayed, and the specification screen 220 is displayed at the display unit 141 of the client apparatus 140. Furthermore, the user can specify the image-capturing area of the PTZ camera 120 on the specification screen 220.

The specification screen 220 includes a display frame 200, a first display area 201, a second display area 202, and a specifiable area 204. The respective portions of the specification screen 220 are displayed inside the display frame 200.

The first display area 201 is an area in the specification screen 220 which corresponds to the image-capturing area of the wide-area camera 110. The first image 210 captured by the wide-area camera 110 is displayed on the first display area 201. Because the first display area 201 is an area corresponding to the image-capturing area of the wide-area camera 110, a size thereof is the same as that of the first image 210.

The second display area 202 is an area where the second image 211 captured by the PTZ camera 120 is displayed.

A cursor 203 is an object which the user operates to specify an optional point or an optional range at the display unit 141.

The specifiable area 204 is an area in the specification screen 220 which represents the image-capturable areas 160 and 162 of the PTZ camera 120. A pan angle, a tilt angle, and a zoom amount of the PTZ camera 120 are set when the user specifies an area in the specifiable area 204, so that the PTZ camera 120 can image the image-capturing area corresponding to the area specified by the user (specified area). Thus, the image-capturing direction and the viewing angle of the PTZ camera 120 are changed. The first image 210 is displayed at a position corresponding to the image-capturing areas 161 and 163 of the wide-area camera 110 in the specifiable area 204. The first image 210 is included in and overlapped with the specifiable area 204. An area (i.e., an area outside the first image 210) different from the area of the first image 210 in the specifiable area 204 is called as an outside area 212. The specifiable area 204 is an example of the second screen area.

In the present exemplary embodiment, the user uses the input unit 142 to operate the cursor 203 and specifies an area within the specifiable area 204 by specifying an optional point or an optional range within the specifiable area 204, so that the image-capturing direction and the viewing angle of the PTZ camera 120 can be changed. At this time, based on the output from the input unit 142, the system control unit 143 of the client apparatus 140 accepts an area in the specifiable area 204 specified by the user.

In the specification screen 220, the specifiable area 204 includes an area outside the first display area 201 where the first image 210 is displayed. In the present exemplary embodiment, the specifiable area 204 includes the entire first display area 201. Then, the outside area 212 is adjacent to the first display area 201 in the entire circumference of the first display area 201. The outside area 212 is displayed as a blank space.

For example, the system control unit 124 of the image-capturing apparatus 100 periodically transmits the first image 210 captured by the wide-area camera 110 and the second image 211 captured by the PTZ camera 120 to the client apparatus 140. The system control unit 143 of the client apparatus 140 uses the first image 210 and the second image 211 received from the image-capturing apparatus 100 to update the first image 210 and the second image 211 in the specification screen 220.

Figure 6:
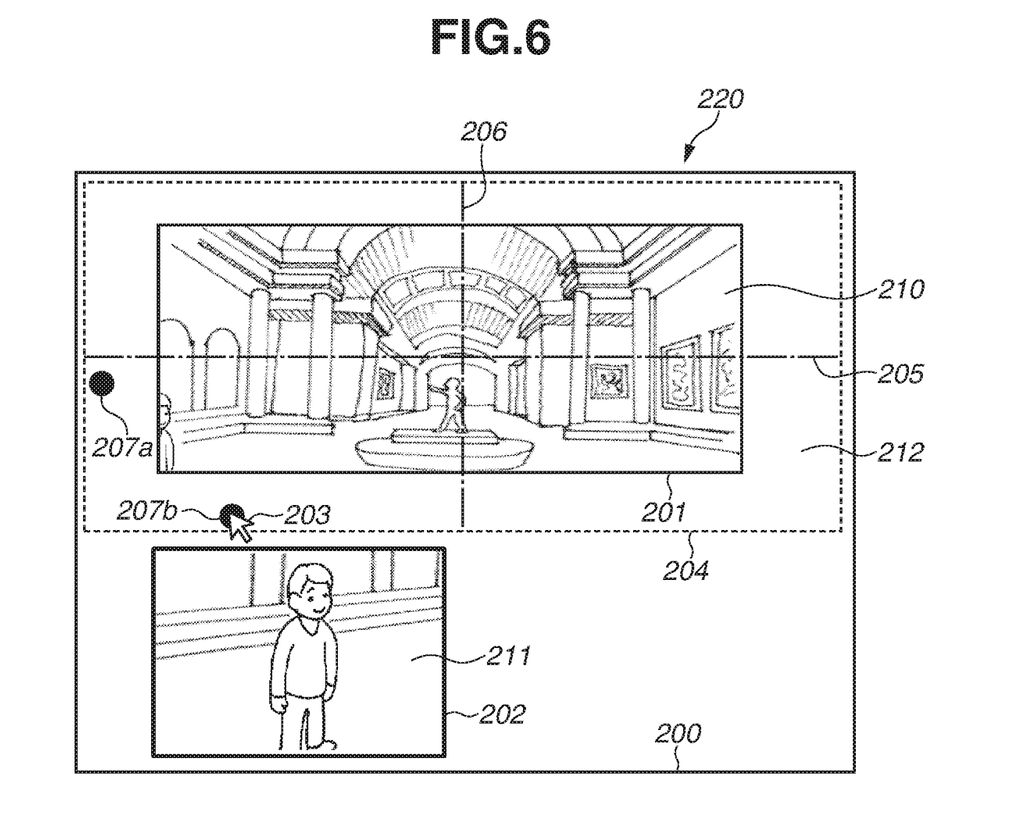
FIG. 6 is a diagram illustrating an example of a specification screen according to one embodiment.

Next, a method of setting the image-capturing direction and the viewing angle of the PTZ camera 120 by using the specification screen 220 will be described with reference to FIG. 6. FIG. 6 is a diagram illustrating an example of the specification screen 220. As illustrated in FIG. 6, coordinates consisting of a horizontal direction axis 205 and a vertical direction axis 206 respectively corresponding to the pan direction and the tilt direction of the PTZ camera 120 is set to the specifiable area 204. The user operates the cursor 203 to specify an optional point in the coordinates. The horizontal direction axis 205 and the vertical direction axis 206 may or may not be actually displayed in the specification screen 220.

In the present exemplary embodiment, in the specifiable area 204, a center of a direction in which the horizontal direction axis 205 extends corresponds to the pan angle of 0°, a left end thereof corresponds to the pan angle of −90°, and a right end thereof corresponds to the pan angle of 90°. Further, in the specifiable area 204, a center of a direction in which the vertical direction axis 206 extends corresponds to the tilt angle of 30°, an upper end thereof corresponds to the tilt angle of 0°, and a lower end thereof corresponds to the tilt angle of 60°. In the present exemplary embodiment, the pan angle and the tilt angle are linearly changed in the specifiable area 204. However, the configuration is not limited thereto. For example, the pan angle and the tilt angle may be non-linearly allocated based on the curvature of the wide-area camera 110.

As illustrated in FIG. 6, the user operates the input unit 142 to specify a range specification starting point 207a and a range specification ending point 207b to specify a rectangular area (area to be specified) having these two points 207a and 207b on a diagonal line. The specified area corresponds to a new image-capturing area of the PTZ camera 120. The specification of the area to be specified executed by the user corresponds to an instruction for changing the image-capturing area of the PTZ camera 120. In the example in FIG. 6, the specified area includes a part of the first image 210 and a part of the outside area 212 adjacent to the first image 210. The specified area is an example of the first screen area. The specified area may be an area consisting of only a part of the outside area 212, or may be an area consisting of only a part of the first image 210.

By accepting the range specification starting point 207a and the range specification ending point 207b based on the output of the input unit 142, the system control unit 143 of the client apparatus 140 accepts a rectangular specified area having the two points 207a and 207b on a diagonal line.

Then, in order to image the image-capturing area corresponding to the specified area through the PTZ camera 120, the system control unit 143 calculates the image-capturing direction and the viewing angle of the PTZ camera 120 based on the accepted range specification starting point 207a and the range specification ending point 207b. Information about the image-capturing direction and the viewing angle of the PTZ camera 120 calculated in the above is called as image-capturing area information.

Then, the system control unit 143 transmits the image-capturing area information to the image-capturing apparatus 100. Based on the image-capturing area information transmitted from the client apparatus 140, the system control unit 124 of the image-capturing apparatus 100 changes the image-capturing direction and the viewing angle of the PTZ camera 120 through image-capturing area setting processing described below. More specifically, based on the image-capturing area information, the system control unit 124 drives the zoom motor 127, the pan motor 128, and the tilt motor 129 via the driving control unit 126.

Figure 7:
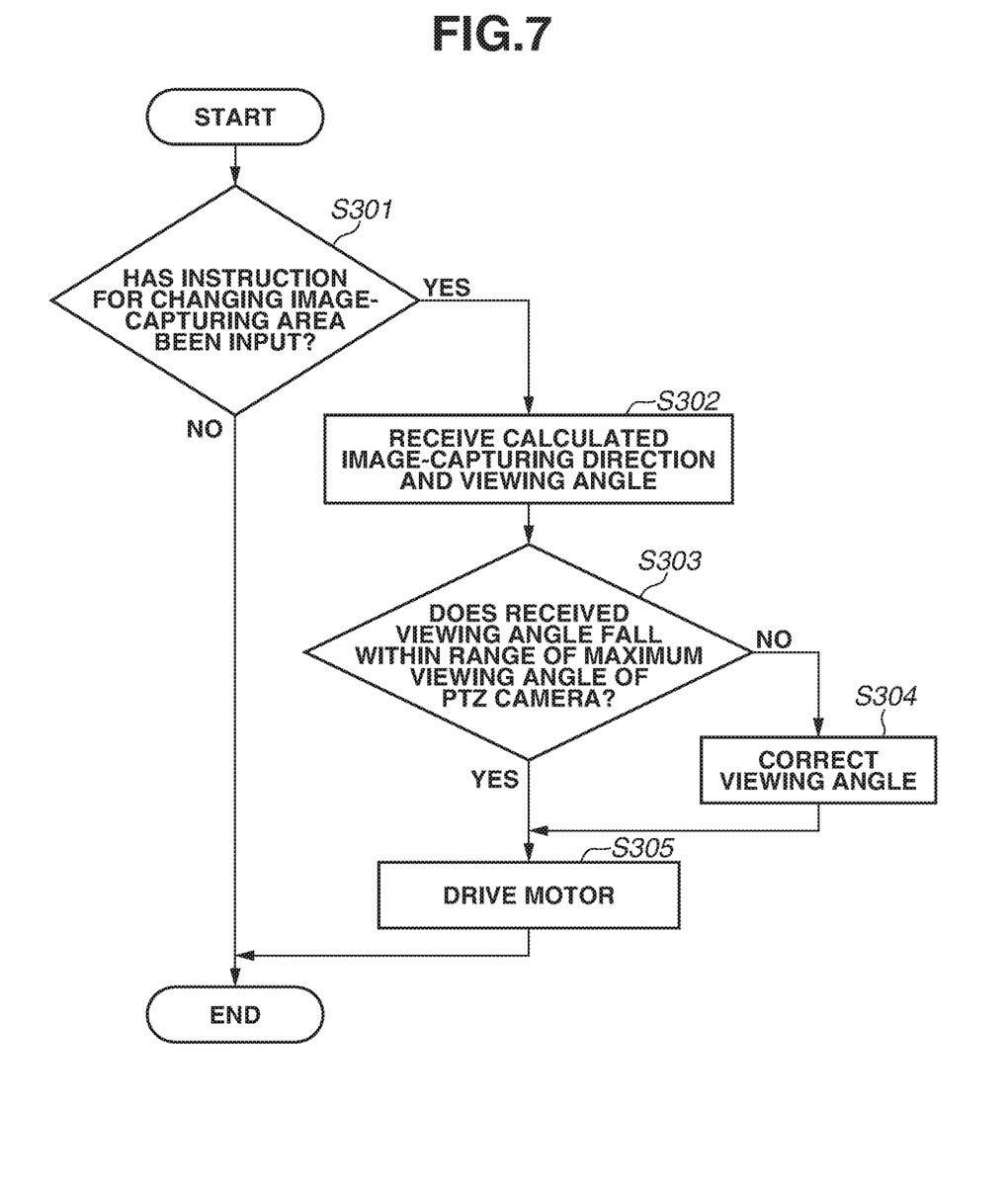
FIG. 7 is a flowchart illustrating an example of image-capturing area setting processing according to one embodiment.

Next, image-capturing area setting processing will be described with reference to FIG. 7. FIG. 7 is a flowchart illustrating an example of the image-capturing area setting processing. The image-capturing area setting processing is executed by the system control unit 124 of the image-capturing apparatus 100. Particularly, the image-capturing area setting processing is processing for setting the image-capturing direction and the viewing angle of the PTZ camera 120. The processing in FIG. 7 is one example of the processing executed by the image-capturing control unit.

In step S301, based on the communication executed by the client apparatus 140 and the image-capturing apparatus 100, the system control unit 124 determines whether the user has input an instruction for changing the image-capturing area of the PTZ camera 120 via the input unit 142 of the client apparatus 140. If the system control unit 124 determines that the user has input the instruction for changing the image-capturing area of the PTZ camera 120 (YES in step S301), the processing proceeds to step S302. If the system control unit 124 determines that the user has not input the instruction (NO in step S301), the processing in FIG. 7 ends.

In step S302, the system control unit 124 receives image-capturing area information from the client apparatus 140. As described above, the image-capturing area information is information about the image-capturing direction and the viewing angle of the PTZ camera 120 calculated by the client apparatus 140.

In step S303, the system control unit 124 determines whether the viewing angle included in the image-capturing area information received in step S302 falls within a range of the maximum viewing angle of the PTZ camera 120. If the system control unit 124 determines that the viewing angle included in the image-capturing area information falls within the range of the maximum viewing angle of the PTZ camera 120 (YES in step S303), the processing proceeds to step S305. If the system control unit 124 determines that the viewing angle included in the image-capturing area information does not fall within the range of the maximum viewing angle of the PTZ camera 120 (NO in step S303), the processing proceeds to step S304.

In step S304, the system control unit 124 corrects the viewing angle included in the image-capturing area information received in step S302 to be the maximum viewing angle of the PTZ camera 120. However, the system control unit 124 may correct the viewing angle included in the image-capturing area information received in step S302 to be an angle smaller than the maximum viewing angle of the PTZ camera 120.

In step S305, based on the image-capturing area information, the system control unit 124 drives the zoom motor 127, the pan motor 128, and tilt motor 129 via the driving control unit 126. Through the above processing, the system control unit 124 controls the image-capturing direction and the viewing angle of the PTZ camera 120 to be the image-capturing direction and the viewing angle specified by the user. Then, the system control unit 124 controls the PTZ camera 120 to image the image-capturing area corresponding to the area specified at the specification screen 220 to acquire the second image 211. If correction is executed in step S304, the system control unit 124 controls the PTZ camera 120 to capture the image in the image-capturing direction corresponding to the area specified at the specification screen 220 at the corrected viewing angle to acquire the second image 211.

The system control unit 143 of the client apparatus 140 periodically receives the second image 211 from the system control unit 124 of the image-capturing apparatus 100 to display the second image 211 on the specification screen 220. The processing for displaying the second image 211 is one example of processing executed by the second display control unit.

As described above, at the specification screen 220, the user can specify the area to be specified including a part of the outside area 212. Then, the client apparatus 140 displays on the specification screen 220 the second image 211 acquired by the PTZ camera 120 imaging the image-capturing area corresponding to the specified area. Therefore, the user can intuitively specify the image-capturing area which is not included in the image-capturing area corresponding to the first image 210. Then, the user can easily display the second image 211 acquired by imaging the area outside the ranges of the image-capturing areas 161 and 163 of the wide-area camera 110. Further, in the image-capturing system according to the present exemplary embodiment, as illustrated in FIG. 6, an entirety of the object positioned across the boundary of the image-capturing area of the wide-area camera 110 can be imaged by the PTZ camera 120 and displayed, so that usability of the user is improved.

Variation Example

In the above-described exemplary embodiment, the outside area 212 in FIG. 6 is displayed as a blank space in the specification screen 220. However, for example, the system control unit 143 of the client apparatus 140 may color and display the outside area 212 to be distinguishable from the first image 210.

Further, the system control unit 143 may display in the outside area 212 an image of an image-capturing area corresponding to the outside area 212 which has been captured and acquired by the PTZ camera 120 in the past. In this case, the image-capturing apparatus 100 causes the PTZ camera 120 to capture the image corresponding to the outside area 212 at the time of activation, and transmits the captured image to the client apparatus 140. The client apparatus 140 combines and displays the image received from the image-capturing apparatus 100 in the outside area 212. Thereafter, every time the image-capturing apparatus 100 images the image-capturing area corresponding to the outside area 212, the client apparatus 140 updates the image displayed in the outside area 212 by using the image acquired through the image-capturing operation. The system control unit 143 may display in only a part of the outside area 212 the image captured by the PTZ camera 120 and acquired in the past. The image displayed in the outside area 212 is an example of the third image.

Further, the system control unit 143 may execute different image processes on the first image 210 displayed in the first display area 201 and the image displayed in the outside area 212. Furthermore, a boundary line between the inside and the outside of the specifiable area 204 may be expressed by a dashed line as illustrated in FIG. 5 or 6, or may be expressed by a solid line. Further, instead of displaying the boundary line between the inside and the outside of the specifiable area 204, an optional image may be used for distinguishing the inside and the outside of the specifiable area 204.

Furthermore, in the above exemplary embodiment, as described with reference to FIG. 6, the user specifies the range specification starting point 207a and the range specification ending point 207b. Herein, when the range specification starting point 207a is specified by the user, the system control unit 143 may display a reference area described below on the specification screen 220. The reference area is a rectangular-shaped area having the range specification starting point 207a as a vertex, and is an area such that the PTZ camera 120 can image the image-capturing area corresponding thereto at the maximum viewing angle. Because the PTZ camera 120 can image the image-capturing area corresponding to the area included in the reference area, the user can easily specify the area to be imaged by the PTZ camera 120 at the specification screen 220. The reference area is an example of the third screen area.

Further, in the above-described exemplary embodiment, a range of the pan angle and the tilt angle of the PTZ camera 120 are previously determined. However, the range of the pan angle and the tilt angle of the PTZ camera 120 may be adjusted by executing calibration at the initial setting of the image-capturing apparatus 100.

Furthermore, in the above-described exemplary embodiment, in steps S303 and S304 in FIG. 7, determination about whether the viewing angle included in the image-capturing area information falls within the range of the maximum viewing angle of the PTZ camera 120 and correction of the image-capturing area information are executed by the system control unit 124 of the image-capturing apparatus 100. However, determination about whether the viewing angle included in the image-capturing area information falls within the range of the maximum viewing angle of the PTZ camera 120 and correction of the image-capturing area information may be executed by the system control unit 143 of the client apparatus 140. In this case, the system control unit 143 transmits the corrected image-capturing area information to the image-capturing apparatus 100, and the image-capturing apparatus 100 executes control of changing the image-capturing direction and the viewing angle of the PTZ camera 120 based on the received image-capturing area information.

The system control unit 143 of the client apparatus 140 may display an error message at the display unit 141 when a range specified by the user at the specification screen 220 represents the viewing angle that exceeds the maximum viewing angle of the PTZ camera 120. Then, in this case, the system control unit 143 may execute control of not accepting the area specified by the user.

In the above-described exemplary embodiment, as illustrated in FIGS. 5 and 6, the entire first image 210 overlaps with the specifiable area 204. However, if the image-capturing areas 161 and 163 of the wide-area camera 110 and the image-capturable areas 160 and 162 of the PTZ camera 120 partially overlap, a part of the first image 210 overlaps with the specifiable area 204 accordingly.

Further, the image-capturing apparatus 100 may use a camera capable of changing only one of the image-capturing direction and the viewing angle instead of using the PTZ camera 120.

Other Exemplary Embodiments

Various embodiments of the present disclosure can be realized in such a manner that a program for realizing one or more functions according to the above-described exemplary embodiments is supplied to a system or an apparatus via a network or a storage medium, and one or more processors of a computer in the system or the apparatus read and execute the program. Further, various embodiments of the present disclosure can also be realized with a circuit (e.g., application specific integrated circuit (ASIC)) that realizes one or more functions.

While the exemplary embodiments have been described, the above-described exemplary embodiments are merely the examples embodying various embodiments of the present disclosure, and should not be construed as limiting the technical range of the present disclosure. In other words, embodiments of the present disclosure can be realized in diverse ways without departing from the technical spirit or main features of the present disclosure.

For example, a plurality of CPUs may be provided as a hardware configuration of the image-capturing apparatus 100 or the client apparatus 140, and the plurality of CPUs may execute the processing based on the program stored in the HDD of each of the apparatuses. Furthermore, in place of the CPU, a graphics processing unit (GPU) may be used as the hardware configuration of the image-capturing apparatus 100 or the client apparatus 140.

As described above, according to the above-described exemplary embodiment, an image acquired by imaging a desired image-capturing area can be easily displayed.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-072231, filed Apr. 4, 2018, which is hereby incorporated by reference herein in its entirety.

What is claimed is:

1. An image-capturing system comprising:
a plurality of fixed first image-capturing units configured to be able to capture a first imaging region;
a second image-capturing unit configured to be able to capture a second imaging region wider than the first imaging region by changing an imaging direction of the second image-capturing unit, wherein the second image-capturing unit captures at least a portion of the first imaging region, and wherein the second imaging region includes entire of the first imaging region;
a first display control unit configured to display, on a display screen, a first image indicating the first imaging region and a second image indicating the second imaging region, wherein the second image is displayed around the first image, and wherein a specified region to be captured by the second image-capturing unit is specified in the second image displayed on the display screen;
an image-capturing control unit configured to control the second image-capturing unit to acquire an image corresponding to the specified region by controlling an image-capturing direction of the second image-capturing unit based on the specified region;
a second display control unit configured to display, on the display screen, the image acquired through the control executed by the image-capturing control unit; and
wherein the first display control unit displays the first image at a position corresponding to the first imaging region of the first image-capturing unit in the second imaging region.

2. The image-capturing system according to claim 1, wherein the first display control unit displays a third image acquired by the second image-capturing unit which images an image-capturing area corresponding to a portion which does not overlap with the first image, in the second image, the third image being displayed in the portion which does not overlap with the first image, in the second image.

3. The image-capturing system according to claim 2, wherein the first display control unit executes, on the third image, image processing different from image processing executed on the first image.

4. The image-capturing system according to claim 2, wherein the first display control unit updates the third image on the display screen, every time the third image is acquired through image-capturing executed by the second image-capturing unit.

5. The image-capturing system according to claim 1, wherein, in a case where one point is specified at the display screen, the first display control unit displays a third imaging region having the one point as a vertex, in which the second image-capturing unit can image a corresponding image-capturing area at a maximum viewing angle, on the display screen.

6. The image-capturing system according to claim 1, wherein, in a case where a viewing angle at which the second image-capturing unit images an image-capturing area corresponding to the specified region at the display screen, exceeds a maximum viewing angle of the second image-capturing unit, the image-capturing control unit controls the viewing angle of the second image-capturing unit to fall within the maximum viewing angle and controls the second image-capturing unit to acquire the second image by imaging an image-capturing area corresponding to the specified region.

7. The image-capturing system according to claim 1, wherein the first image-capturing unit captures an image at a fixed viewing angle.

8. The image-capturing system according to claim 1, wherein the second image-capturing unit is able to change the image-capturing direction in a pan direction and a tilt direction, and further is able to change a viewing angle.

9. The image-capturing system according to claim 1, wherein each of the plurality of fixed first image-capturing units is a wide-area camera.

10. An information processing apparatus comprising:
a first acquisition unit configured to acquire information indicating a first imaging region that is able to be imaged by a plurality of fixed first image-capturing units, wherein the first imaging region defines a region of a synthesized image that is obtained by synthesizing a plurality of images imaged by the plurality of fixed first image-capturing units;
a second acquisition unit configured to acquire information indicating a second imaging region that is able to be imaged by a second image-capturing unit with the second image capturing unit changing an imaging direction of the second image-capturing unit, the second imaging region being wider than the first imaging region, wherein the second image-capturing unit captures at least a portion of the first imaging region, and wherein the second imaging region includes entire of the first imaging region;
a display control unit configured to display, on a display screen, a first image indicating the first imaging region and a second image indicating the second imaging region, wherein the second image is displayed around the first image, and wherein a specified region to be captured by the second image-capturing unit is specified in the second image displayed on the display screen;
a third acquisition unit configured to acquire information indicating the specified region, wherein the second image-capturing unit changes the imaging direction so as to capture the specified region; and
wherein the display control unit displays the first image at a position corresponding to the first imaging region of the first image-capturing unit in the second imaging region.

11. A control method of an information processing apparatus comprising:
acquiring information indicating a first imaging region that is able to be imaged by a plurality of fixed first image-capturing units, wherein the first imaging region defines a region of a synthesized image that is obtained by synthesizing a plurality of images imaged by the plurality of fixed first image-capturing units;
acquiring information indicating a second imaging region thatis able to be imaged by a second image-capturing unit with the second image capturing unit changing an imaging direction of the second image-capturing unit, the second imaging region being wider than the first imaging region, wherein the second image-capturing unit captures at least a portion of the first imaging region, and wherein the second imaging region includes entire of the first imaging region;
displaying, on a display screen, a first image indicating the first imaging region and a second image indicating the second imaging region, wherein the second image is displayed around the first image, and wherein a specified region to be captured by the second image-capturing unit is specified in the second image displayed on the display screen; and
acquiring information indicating the specified region, wherein the second image-capturing unit changes the imaging direction so as to capture the specified region,
wherein the first image is displayed at a position corresponding to the first imaging region of the first image-capturing unit in the second imaging region.

12. A non-transitory computer-readable storage medium storing a program for causing a computer to function as units comprising:
a first acquisition unit configured to acquire information indicating a first imaging region that is able to be imaged by a plurality of fixed first image-capturing units, wherein the first imaging region defines a region of a synthesized image that is obtained by synthesizing a plurality of images imaged by the plurality of fixed first image-capturing units;
a second acquisition unit configured to acquire information indicating a second imaging region that is able to be imaged by a second image-capturing unit with the second image capturing unit changing an imaging direction of the second image-capturing unit, the second imaging region being wider than the first imaging region, wherein the second image-capturing unit captures at least a portion of the first imaging region, and wherein the second imaging region includes entire of the first imaging region;
a display control unit configured to display, on a display screen, a first image indicating the first imaging region and a second image indicating the second imaging region, wherein the second image is displayed around the first image, and wherein a specified region to be captured by the second image-capturing unit is specified in the second image displayed on the display screen; and
a third acquisition unit configured to acquire information indicating the specified region, wherein the second image-capturing unit changes the imaging direction so as to capture the specified region,
wherein the first image is displayed at a position corresponding to the first imaging region of the first image-capturing unit in the second imaging region.

* * * * *